E. ANTHONY.
MOTOR.

No. 172,904.　　　　　　　Patented Feb. 1, 1876.

Witnesses.
William H. Low.

Inventor.
Edmund Anthony

UNITED STATES PATENT OFFICE.

EDMUND ANTHONY, OF ALBANY, NEW YORK.

IMPROVEMENT IN MOTORS.

Specification forming part of Letters Patent No. 172,904, dated February 1, 1876; application filed November 6, 1875.

*To all whom it may concern:*

Be it known that I, EDMUND ANTHONY, of the city and county of Albany and State of New York, have invented a new and useful Improvement on Motors, actuated by water, steam, &c., of which the following is a full and exact description, reference being had to the accompanying drawing, making a part of this specification, in which—

Figure 1:
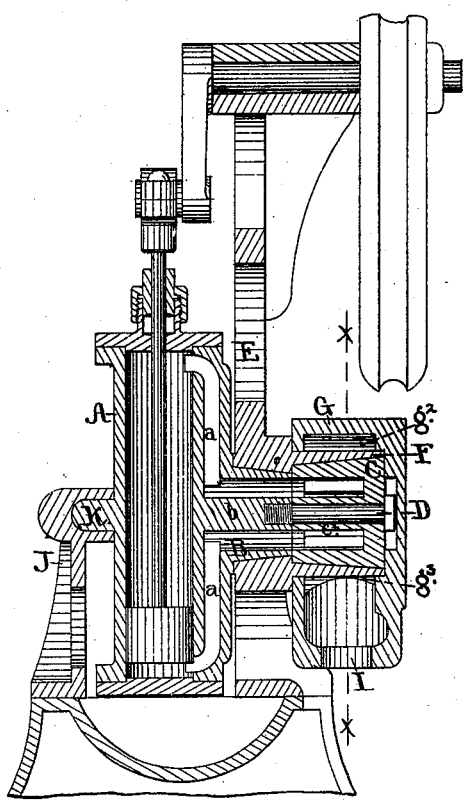
Figure 2:
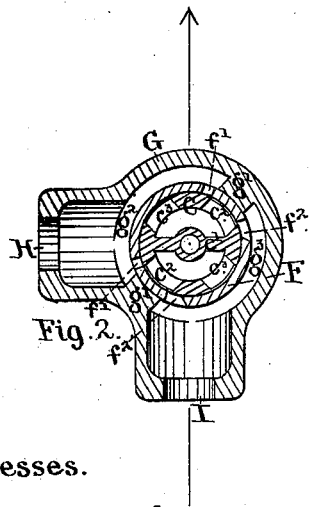
Figure 3:
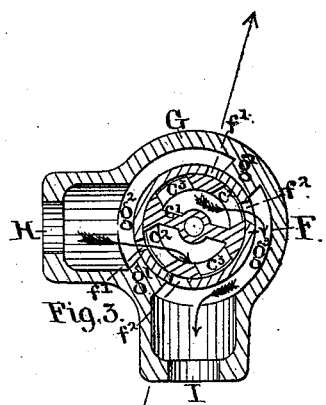

Figure 1 is a longitudinal section, and Figs. 2 and 3 transverse sections at the line $x\,x$.

My invention relates to motors having pistons working in oscillating cylinders; and it consists, first, in the peculiar construction of the ports, valve, valve seat and chest, in the manner herein shown and described; and, secondly, in constructing the trunnion of cylinder through which the fluids pass, and the valve, in the form of truncated cones, whose apices are secured together, as shown and described, so that when used in bearings having a corresponding form the wear of these parts may be readily compensated for.

As shown in the drawing, A is the cylinder of the motor, provided with the ports $a$, which form passages for the flow of the fluids into and from each end of the cylinder through the trunnion B, which is made in the form of a truncated cone, and is divided by the division-plate $b$ into two openings, which form the trunnion termini of the ports $a$. C is the valve, which is also made in the form of a truncated cone of a larger diameter than the trunnion, this increase of diameter being made for the purpose of forming a shoulder, by means of which I am enabled to secure a perfectly tight joint, thereby avoiding the necessity for making so close a fit of the trunnion and valve to their bearings as to create excessive friction. The valve C has its largest end closed, and is divided into two sections, corresponding with the openings in the trunnion, by the division-plate $c^1$. It also has the openings $c^2$ cut radially through its periphery, for the induction and eduction of the fluids to and from the cylinder. The trunnion B and valve C are joined at their apices, and are secured together by the bolt D, and—as I preferably use to insure their coincident motion—by dowel-pins. E is the frame-work of the motor, provided with bearings for the trunnion B and the driving-shaft. The trunnion-bearing is bored to fit the conical form of the trunnion, and terminates in a stationary collar, F, which forms the seat for the valve C. It is provided with the induction-openings $f^1$ and eduction-openings $f^2$, as shown in the drawing. The valve-chest G is fitted snugly over the collar F, and is secured to the frame-work E. When fixed in its position over the collar F, an annular passage is formed between it and the collar, which is divided by the bars $g^1$ into two parts, one of which, $g^2$, forms an induction-passage communicating with the induction-openings $f^1$, and the other, $g^3$, an eduction-passage communicating with the eduction-openings $f^2$. The bars $g^1$ must be placed between the induction-openings $f^1$ and eduction-openings $f^2$, so as to cut off all communication between these openings outside of the collar F. H is an orifice for receiving the supply-pipe, which enters the induction-passage $g^2$, and I is a similar orifice for the discharge-pipe, which leads from the eduction-passage $g^3$. J is a bracket forming the bearing for the imperforate trunnion K of the cylinder.

The balance of the parts, consisting of the piston, piston-rod, crank, driving-shaft, and wheel, may be constructed in any common and well-known manner, and constitute no part of my invention.

When in operation the valve C moves with the oscillation of the cylinder, so as to open the proper induction and eduction openings for the stroke that the piston is making, the position shown in Fig. 3 being that due to the upward stroke of the piston when the cylinder has its maximum oscillation, and the openings have their greatest capacity. When the crank arrives at either of the dead-center points the openings of the valve are brought into the position, in relation to the openings $f^1$ and $f^2$, shown in Fig. 2. When in this position it will be seen that the openings $c^2$ of the valve partially uncover both eduction-openings $f^2$ of the valve-seat, thereby giving sufficient "lead" to secure a free discharge of the fluid, so as to insure the most efficient action of the motor free from the evils arising from counter-pressure on the piston, where the eduction-openings are not uncovered quickly enough. Where water or any non-compressible fluid is used this lead will be found of the greatest importance, as any delay in the free opening of the discharge or exhaust will confine the fluid in the cylinder, so as to retard or entirely prevent the crank from passing over its centers.

By the arrangement of openings shown by the drawing the motor will only run in one direction, as the oscillation of the cylinder in the contrary direction closes the proper opening. By this means a certainty is secured of the motor always running in the right direction. Therein the valve motion of my motor differs from the ordinary valve motion of oscillating cylinders, when simply operated by the rocking of the cylinder, independently of any motion desired from an eccentric, or some equivalent device. Motors that are required to run in a contrary direction to the one shown in the drawing can be readily constructed by simply exchanging the relative positions of the induction and eduction openings, and arranging their respective pipes in a corresponding manner.

When the trunnion and valve, or their bearings, become so worn as to create a leakage, the defect may be remedied by facing off the apex of the trunnion or valve, so as to allow the larger parts of the cones to enter deeper into the bearings.

I claim as my invention—

1. The oscillating cylinder A having a conical trunnion, B, in combination with a conical valve, C, when constructed and arranged to operate in conical bearings in the manner and for the purpose herein specified.

2. The combination of the conical trunnion B with a conical valve, C, having a greater diameter than the trunnion, as and for the purpose herein set forth.

3. The valve C, having its opening $c^2$ arranged in relation to the eduction openings $f^2$ of the valve-seat F in the manner and for the purpose herein described.

4. The combination of the conical trunnion B, having a division-plate, $b$, with the conical valve C having a division-plate, $c^1$, when arranged, as herein shown and described, for forming the continuous passages communicating with the ports $a$ of the cylinder A, for the purposes herein specified.

5. The combination of the oscillating cylinder A, having a conical trunnion, B, and conical valve C, with the stationary valve-seat F and valve-chest G, when constructed and arranged to operate as and for the purposes specified.

EDMUND ANTHONY.

Witnesses:
SANFORD R. HASKELL,
WM. H. LOW.